United States Patent [19]

Sakano

[11] Patent Number: 4,934,158

[45] Date of Patent: Jun. 19, 1990

[54] REFRIGERATING SYSTEM FOR USE IN VEHICLE WITH ENGINE WHICH ENABLES SELECTIVE USE OF COMMERCIAL AC POWER SOURCE AND A GENERATOR DRIVEN BY THE ENGINE FOR DRIVING A REFRIGERANT COMPRESSOR

[75] Inventor: Riichi Sakano, Okabe, Japan

[73] Assignee: Sanden Corporation, Gunma, Japan

[21] Appl. No.: 344,959

[22] Filed: Apr. 28, 1989

[30] Foreign Application Priority Data

Apr. 28, 1988 [JP] Japan .................. 63-104332

[51] Int. Cl.[5] .............................................. B60H 1/32
[52] U.S. Cl. ..................... 62/239; 62/196.2; 62/244
[58] Field of Search ................ 62/244, DIG. 16, 237, 62/196.2

[56] References Cited

U.S. PATENT DOCUMENTS

| | | | |
|---|---|---|---|
| 4,051,691 | 10/1977 | Dawkins ......................... | 62/244 X |
| 4,439,998 | 4/1984 | Horvay et al. ................... | 62/199 |
| 4,483,151 | 11/1984 | Fujioka et al. ................... | 62/157 |
| 4,565,072 | 1/1986 | Fujiwara et al. ................. | 62/196.2 |
| 4,637,220 | 1/1987 | Sakano ............................ | 62/200 |
| 4,741,171 | 5/1988 | Toshiyuki ....................... | 62/237 |
| 4,861,837 | 5/1989 | Negishi et al. .................. | 62/239 |

FOREIGN PATENT DOCUMENTS 2072822 10/1981 United Kingdom .

Primary Examiner—Lloyd L. King
Attorney, Agent, or Firm—Banner, Birch, McKie & Beckett

[57] ABSTRACT

In a cooling system including a refrigerant compressor for use in a vehicle for refrigerating a refrigerant compartment, the refrigerant compressor is a hermetic type compressor containing a DC electric motor as a compressor driver. An electric generator is actuated by an engine of the vehicle to generate an AC voltage which is, in turn, rectified by a rectifier to produce a DC power for driving the DC electric motor. A switch is provided to switch over from the electric generator to a commercial AC power source so that the commercial AC power is rectified by the rectifier to supply the DC power to thereby enable to drive the compressor by use of the commercial AC power source during a time period when the engine is stopped. In order to cool a passenger compartment of the vehicle, another compressor is provided to be driven by the engine. The other compressor can be temporally used for compressing refrigerant for refrigerating the refrigerant compartment together with the refrigerant compressor by valve control.

10 Claims, 4 Drawing Sheets

REFRIGERATING SYSTEM FOR USE IN VEHICLE WITH ENGINE WHICH ENABLES SELECTIVE USE OF COMMERCIAL AC POWER SOURCE AND A GENERATOR DRIVEN BY THE ENGINE FOR DRIVING A REFRIGERANT COMPRESSOR

BACKGROUND OF THE INVENTION

1. Field of the Invention

The present invention relates to a refrigerating system and, in particular, to a compressor driving system in such a refrigerating system for use in a vehicle with an engine, for example, an automotive refrigerator van.

2. Description of the Prior Art

In order to cool, chill or refrigerate food, drinks, and/or others, a refrigerating system is provided in a vehicle, for example, an automobile. A dedicated vehicle is also known as a refrigerator van or chill car for transporting cold, chilled, or refrigerated food.

The refrigerator system for use in a vehicle usually has a refrigerant circuit which comprises a refrigerant compressor for compressing refrigerant, a refrigerant evaporator for cooling a refrigerator compartment, and piping for refrigerant flow path. The compressor is usually driven by an engine of the vehicle.

In the system, the engine must be driven for cooling the food and/or drinks in the refrigerator compartment even during the period when the vehicle stops.

However, it is undesired to drive the engine for a long time, for example, throughout the night, when the driver is sleeping.

Therefore, another compressor of a motor driven type is usually provided as a standby compressor, especially, in the dedicated vehicle. The standby compressor is driven by use of the commercial AC power source.

However, the additional provision of the standby compressor complicates piping of the refrigerant circuit.

Further, it is difficult to carry out accurate temperature control in the refrigerator system because the refrigerant compressor is driven by the engine which often varies in R.P.M. when is driven.

On the other hand, an air conditioning or cooling system is usually provided in the vehicle for cooling the passenger compartment. A refrigerant compressor and an evaporator in the air conditioning system are commonly mounted on the vehicle independent from the compressor and the evaporator for the refrigerator system on the vehicle. Although the remaining refrigerant circuit elements, for example, a refrigerant compressor and a receiver and dryer device, are common in the air conditioning and the refrigerator systems, use of three compressors complicates the piping of the refrigerant circuit for the air conditioning and the refrigerator systems.

SUMMARY OF THE INVENTION

Therefore, it is an object of the present invention to provide a system for driving a refrigerant compressor in a refrigerator system for use in a vehicle having an engine which provides a refrigerator system without any standby compressor, and wherein a single compressor can be driven by the engine and can also be driven by the commercial AC power source during a time period when the engine stops.

Further, it is another object of the present invention to provide a cooling system for cooling a passenger compartment which has no standby compressor and therefore has less complicated piping for a refrigerant circuit.

The present invention provides a system for driving a refrigerant compressor in a refrigerator system for use in a vehicle having an engine. The driving system comprises an electric generator to be mounted on the vehicle and driven by the engine for generating an AC voltage; selecting means having a first input port coupled to the electric generator for receiving the AC voltage, a second input port to be connected to a commercial AC power source for receiving an AC power and an output port, the selecting means selecting one of the AC voltage and the AC power as a selected AC power to deliver the selected AC power to the output port; rectifying means coupled to the output port of the selecting means for rectifying the selected AC power to produce a DC power; a DC electric motor to be driven by a motor driving current and mechanically coupled to the refrigerant compressor for driving the refrigerant compressor; and a motor driving circuit coupled to the DC electric motor and the rectifying means for producing the motor driving current from the DC power to drive the DC electric motor.

The present invention is further applicable to a cooling system for cooling a passenger compartment and a refrigerator compartment in a vehicle having an engine. The cooling system comprises a first evaporator for permitting a first refrigerant to evaporate to thereby refrigerate the refrigerator compartment, a second evaporator for permitting a second refrigerant to evaporate to thereby cool the passenger compartment, a first refrigerant compressor coupled to the first evaporator for compressing the first refrigerant, and a second refrigerant compressor couple to the second evaporator for compressing the second refrigerant, the second refrigerant compressor being coupled to, and driven by, the engine. According to the present invention, the cooling system comprises an electric generator to be mounted on the vehicle and driven by the engine for generating an AC voltage; selecting means having a first input port coupled to the electric generator for receiving the AC voltage, a second input port to be connected to a commercial AC power source for receiving an AC power and an output port, the selecting means selecting one of the AC current and the AC power as a selected AC power to deliver the selected AC power to the output port; rectifying means coupled to the output port of the selecting means for rectifying the selected AC power to produce a DC power; a DC electric motor to be driven by a motor driving current and mechanically coupled to the first refrigerant compressor for driving the first refrigerant compressor; and a motor driving circuit coupled to the DC electric motor and the rectifying means for producing the motor driving current from the DC power to drive the DC electric motor.

In the cooling system, the first and second refrigerant compressors have a first and a second refrigerant outlet port for delivering the first and the second refrigerant compressed therein, respectively. The cooling system according to an aspect to the present invention comprises a single refrigerant condenser connected in common to the first and the second outlet ports for condensing the first and the second compressed refrigerant to deliver a condensed refrigerant; a first refrigerant path for introducing at least one portion of the condensed refrigerant into the first evaporator as the first refrigerant; and a second refrigerant path for introducing at least one poriton of the condensed refrigerant into the second evaporator as the second refrigerant.

The cooling system may further comprise a first valve connected to the first refrigerant path for selectively opening and closing the first refrigerant path, and a second valve connected to the second refrigerant path for selectively opening and closing the second refrigerant path.

In the cooling system, the first and the second refrigerant compressors having a first and a second inlet port for receiving the first and second refrigerants from the first and second evaporators, respectively. The cooling system may further comprise a third refrigerant path for connecting the first and the second inlet ports and a third valve connected to the third refrigerant path for selectively opening and closing the third refrigerant path, whereby the second refrigerant compressor may operate together with the first compressor to compress the first refrigerant when the first and the third valves being operated to open the first and the third refrigerant paths, respectively while the second valve being operated to close the second refrigerant path.

DESCRIPTION OF PREFERRED EMBODIMENTS

Prior to description of an embodiment of the present invention, description will be made as regards a known cooling system for use in an automotive refrigerator van in order to make a better understanding of the present invention.

Figure 1:
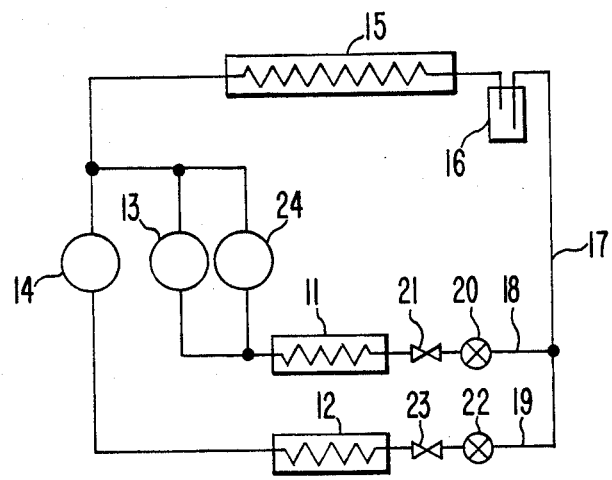
FIG. 1 is a view of a refrigerant circuit of a known system for cooling a refrigerator and a passenger compartment in an automotive refrigerator van.

Referring to FIG. 1, a refrigerant circuit of the known cooling system shown therein comprises a first and a second refrigerant evaporator 11 and 12 for cooling a refrigerator compartment (35 in FIG. 4) and a passenger compartment (34 in FIG. 4), respectively, and for permitting first and second refrigerants to evaporate therein. A first and a second refrigerant compressor 13 and 14 are connected to first and second evaporators 11 and 12 and compress the first and the second refrigerants from first and second evaporators 11, 12, repectively. First and second compressors 13 and 14 have a first and a second outlet port, respectively, which are connected to a common refrigerant condenser 15. Condenser 15 is connected to a receiver and dryer device 16 from which a refrigerant path 17 is led out. The refrigerant path 17 is separated into a first and a second refrigerant path 18 and 19 which are connected to input sides of first and second evaporated 11 and 12, respectively. First refrigerant path 18 has a first valve 20 such as electromagnetic valve and a first expansion device 21 such as an expansion valve or a capillary tube connected in series. Second refrigerant path 19 has a second valve 22 such as an electromagnetic valve and a second expansion device 23 such as an expansion valve or a capillary tube connected in series. The refrigerant circuit further comprises a standby compressor 24 connected across the second compressor 13.

Figure 2:
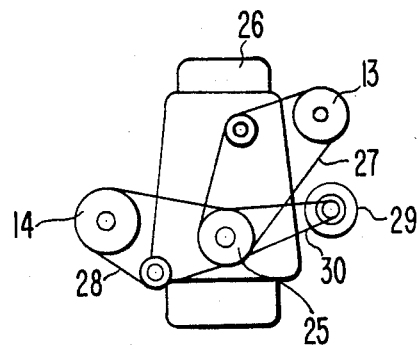
FIG. 2 is a schematic view illustrating a mechanism for driving compressors in the cooling system of FIG. 1 by an automotive engine.

Referring to FIG. 2, first and second compressors 13 and 14 are coupled to a crank pulley 25 of an automotive engine 23 through first and second belts 27 and 28, respectively, and are driven by an output power of autmotive engine 26. Each of first and second compressors 13 and 14 is usually provided with an electromagnetic clutch (not shown) having a pulley on which the belt is wound. Automotive engine 26 also drives an electric generator 29 through a third belt 30 so as to charge an automotive battery (not shown).

In cooling the passenger compartment and the refrigerator compartment, first and second valves 20 and 21 are open, and the electromagnetic clutches are energized so that first and second compressors 13 and 14 are driven by the automotive engine 26 to compress refrigerant together. The compressed refrigerant passes through condenser 15, receiver and dryer device 16, refrigerant path 17 and is then separated into first and second portions which pass through refrigerant paths 18 and 19, respectively. Then, the first and second portions of the refrigerant flow into first and second evaporators 11 and 12, respectively, and evaporate therein to cool the refrigerator compartment and the passenger compartment. Then, the first and second portions of the refrigerant return to first and second compressors 13 and 14 and are again compressed therein. Thus, the refrigerator compartment and the passenger compartment are cooled.

In order to cool the refrigerator compartment when the automotive refrigerator van stops and the automotive engine is stopped, the standby compressor 24 is provided on the van.

Figure 3:
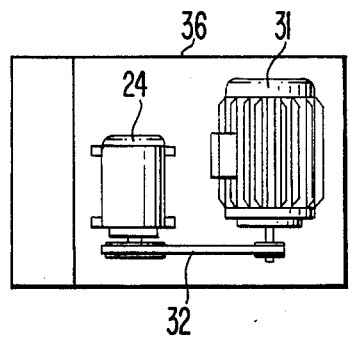
FIG. 3 is a plan view of a standby compressor in the cooling system of FIG. 1 and a motor for driving the standby compressor.

Referring to FIG. 3, the standby compressor 24 is coupled with an electric motor 31 through a belt 32. The electric motor 31 is connected to a commercial power source (not shown) through an electric connector (not shown) when the standby compressor 24 is driven.

Figure 4:
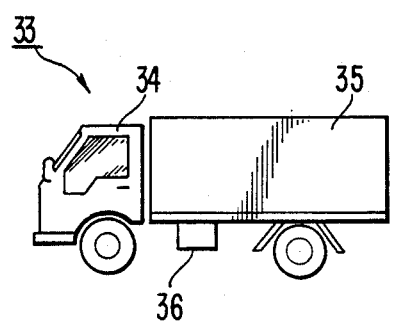
FIG. 4 is a side view of the automotive refrigerant van having the cooling system of FIG. 1.

Referring to FIG. 4, the automotive refrigerator van 33 comprises a driver's room or a passenger compartment 34 and a refrigerator compartment 35. The van 33 also has a case 36 for housing the standby compressor 24 and the electric motor 31 under the refrigerator compartment 35.

In the known cooling system shown in FIGS. 1-4, the first and second compressors are driven by the automotive engine mounted in the van so as to cool the passenger compartment 34 and the refrigerator compartment 35.

It is needless to say that the cooling system is provided with any temperature control circuits which are not described here because the present invention is not directed to such temperature control.

During a time period when the automotive engine 26 stops, the electric motor 31 is connected to the commercial power source and drives the standby compressor 24 so as to refrigerate the refrigarator compartment 35. In this case, the second valve 22 is closed and the first valve 20 is open.

The known system is provided with three compressors 13, 14, 24. This results in complex piping for refrigerant flow paths and a high cost system.

Further, since the first compressor 13 for cooling the refrigerator compartment 35 is also driven by the automotive engine 26 through the belt 27, the refrigerating power varies in response to variation of the R.P.M (Revolutions per Minute) of the automotive engine 26 so that it is difficult to carry out accurate temperature control in the refrigerating compartment.

Figure 5:
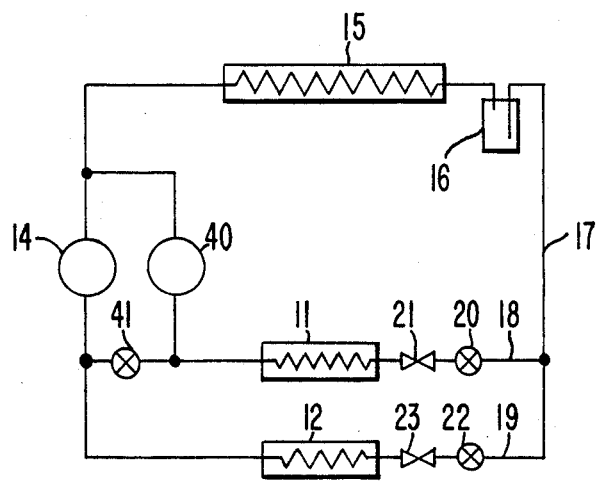
FIG. 5 is a refrigerant circuit of a cooling system according to an embodiment of the present invention.

Referring to FIG. 5, a refrigerant circuit in a cooling system according to an embodiment of the present invention is generally similar to the known refrigerant circuit of FIG. 1 but is different in that the first compressor as shown at 40 is a hermetic type compressor, with a third valve such as an electromagnetic valve 41 being used to connect input ports of the first and the second compressors 40 and 14, and without using a standby compressor. In FIG. 5, similar parts are represented by the same reference numerals as in FIG. 1.

The hermetic type compressor comprises a compressor portion and an electric motor portion which are contained together in a hermetic case. The electric motor portion is for driving the compressor portion.

In place of the hermetic type compressor, a combination of a compressor and an electric motor can be used in the similar manner as shown in FIG. 3.

Figure 6:
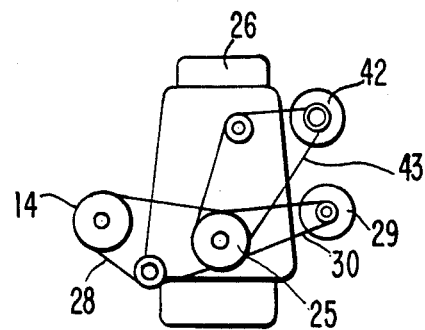
FIG. 6 is a view illustrating a mechanism for driving a compressor and a generator for the cooling system of FIG. 5 by an automotive engine.

Referring to FIG. 6, the automotive engine 26 drives an additional electric generator 42 through a belt 43 in place of the first compressor (13 in FIG. 2) in the prior art. The additional electric generator 42 is for obtaining electric energy for driving the electric motor portion of the hermetic type compressor 40.

Figure 7:
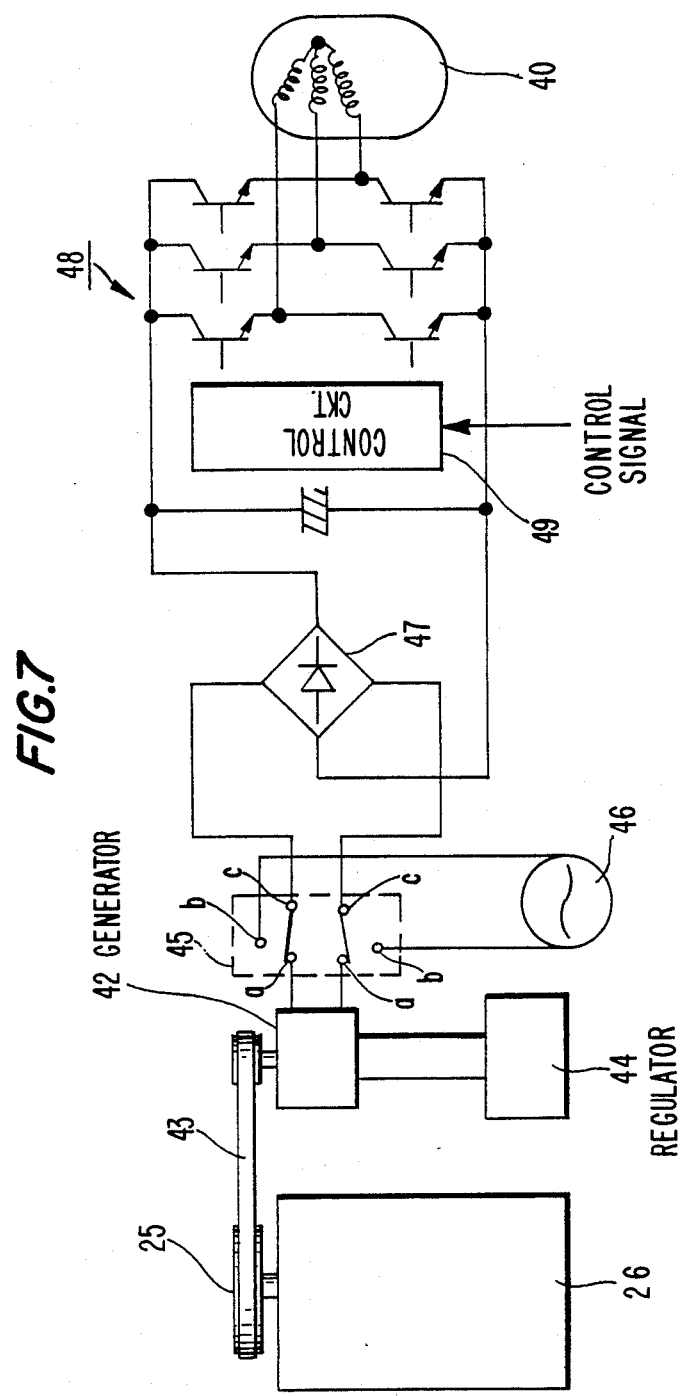
FIG. 7 is a diagram view illustrating a circuit for driving a motor of a compressor for a refrigerator in the cooling system of FIG. 5.

Referring to FIG. 7, the electric generator 42 is coupled with a regulator 44 for regulating a voltage generated by the electric generator 42. An output of the electric generator 42 is connected to a first input port a—a of a switch or selector 45 which is connected to a rectifier circuit 47 through an output port c—c. The switch 45 is further provided with a second input port b—b. The second input port b—b are for connecting a commercial AC power source which is shown at 46 in the figure. The first and the second input ports a—a and b—b are selectively connected to the output port c—c. The rectifying circuit 47 is connected to a motor drive circuit 48 for driving the electric motor portion in the hermetic type compressor 40. The motor drive circuit 48 is a brushless motor driving circuit which comprises transistors and is well known in the art. The motor drive circuit 48 includes a control circuit 49 for controlling the starting and stopping of the motor portion in response to a control signal. The control signal is usually supplied by a thermostat or a temperature sensor. In FIG. 5, a motor portion of the hermetic compressor is only shown by three coils.

Referring to FIGS. 5 through 7, operation will be described below.

When the engine is running, the electric generator 42 is driven and generates AC voltage which is regulated constant (for example, 200 V.) by the regulator 44. The AC voltage is selected as a selected AC power which is supplied to the rectifier circuit 47 through the switch 45 when the first input port a—a is connected to the output port c—c. The selected AC power is rectified at the rectifier circuit 47 and is supplied to the motor drive circuit 48.

When the passenger desires to cool the passenger and the refrigerator compartments, he turns on two system switches (not shown) for the air conditioning system and the refrigerator system. Then, first and second valves 20 and 22 are open and the electromagnetic clutch of the second compressor 14 is also energized to drive the second compressor 14 by the engine output.

It will be readily understood by those skilled in the art that the valves 20 and 22 and the electromagnetic clutch are energized by appropriate energizing circuits (not shown) in response to operation of the system switches.

Also, a start signal is applied to the control circuit 49 as a control signal so that the hermetic type compressor 40 is driven.

Accordingly, refrigerant is compressed by the hermetic compressor 40 and the second compressor 14 and the compressed refrigerant is supplied to the condenser 15. Thereafter, the refrigerant passes through the receiver and dryer device 16 and the path 17 and thereafter separated into first and second portions which flow into the first path 18 and the second path 19, respectively. Then, the first and the second portions of the refrigerant flow into the first and the second evaporators 11 and 12 through the first valve 20 and the first expansion valve 21 and through the second valve 22 and the second expansion valve 23, respectively. Then, the first and the second refrigerant evaporate in the first and the second evaporators 11 and 12 to cool the refrigerator compartment and the passenger compartment, respectively, and thereafter, return to the hermetic type and the second compressors 40, 14 respectively.

The operation is repeated to cool the both compartments.

It will be readily understood that temperature control of the passenger compartment is carried out, for example, by controlling the electromagnetic clutch by sensing temperature in the passenger compartment as well known in the art. Temperature control for the refrigerator compartment is also carried out by a known technique, for example, by supplying an output from a thermostat in the refrigerator compartment to the control circuit 49 as the control signal.

If only one of the compartments, for example, the refrigerator compartment is desired to be cooled, the corresponding system switch should be turned on and the other switch should not be turned on. Then, the second valve 22 is maintained closed and the second compressor 14 is not driven.

If the refrigerator compartment is desired to be rapidly cooled on or after start of cooling the refrigerator compartment, a repid cooling switch (not shown) is operated to open the third valve 41 and to energize the electromagnetic clutch 14. Then, the second compressor 14 operates to compress the refrigerant together with the hermetic type compressor 40 and the all of the compressed regrigerant flows into the first evaporator 11. Therefore, the refrigerator compartment is rapidly cooled. It is needless to say that the second valve 22 is not open but maintained closed.

When the refrigerator compartment is desired to be cooled when the engine 26 is not running, the switch 45 is switched to connect the second input port b—b to the output port c—c and the second input port b—b is connected to the commercial AC power source 46. Then, the commercial AC power source is supplied to the rectifier circuit 47 as the selected AC power source. Therefore, the hermetic compressor 40 can be driven when the coresponding system switch is turned on.

Although the present invention has been described in connection with the cooling system for cooling both of the refrigerant compartment and the passenger compartment in the atuomotive refrigerator van, the present invention can generally be applicable to a refrigerator system for cooling only the refrigerator compartment in a vehicle, regardless of whether an air conditioning system is separately provided in the vehicle.

As described above, the present invention eliminates the need for a standby compressor in the cooling system for use in a vehicle, so that the system is simple in piping for refrigerant and is economical.

What is claimed is:

1. A system for driving a refrigerant compressor in a refrigerator system for use in a vehicle having an engine, said system comprising:
   an electric generator to be mounted on said vehicle and driven by said engine for generating a first AC power signal;
   selecting means having a first input port coupled to said electric generator for receiving said first AC power signal, a second input port connectable to a commercial AC power source for receiving a second AC power signal, and an output port, said selecting means selecting one of said first AC power signal and said second AC power signal as a selected AC power signal and connecting the selected AC power signal to said output port;
   rectifying means coupled to said output port of said selecting means for rectifying said selected AC power signal to produce a DC power signal;
   a DC electric motor mechanically coupled to said refrigerant compressor for driving said refrigerant compressor; and
   a motor driving circuit coupled to said DC electric motor and said rectifying means for driving said DC electric motor in response to the DC power signal.

2. A cooling system for cooling a passenger compartment and a refrigerator compartment in a vehicle having an engine, said cooling system comprising a first evaporator for permitting a first refrigerant to evaporate to thereby refrigerate said refrigerator compartment, a second evaporator for permitting a second refrigerant to evaporate to thereby cool the passenger compartment, a first refrigerant compressor coupled to said first evaporator for compressing the first refrigerant, and a second refrigerant compressor coupled to said second evaporator for compressing the second refrigerant, said second refrigerant compressor being coupled to, and driven by, the engine, wherein the improvement comprises:
   an electric generator to be mounted on said vehice and driven by said engine for generating a first AC power signal;
   selecting means having a first input port coupled to said electric gennerator for receiving said first AC power signal, a second input port connectable to a commercial AC power source for receiving a second AC power signal, and an output port, said selecting means selecting one of said frist AC power signal and said second AC power signal as a selected AC power signal and connecting the selected AC power signal to said output port;
   rectifying means coupled to said output port of said selecting means for rectifying said selected AC power signal to produce a DC power signal;
   a DC electric motor mechanically coupled to said first refrigerant compressor for driving said first refrigerant compressor; and
   a motor driving circuit coupled to said DC electric motor and said rectifying means for driving said DC electric motor in response to the DC power signal.

3. A cooling system as claimed in claim 2, wherein said DC electric motor is contained in a housing together with said first refrigerant compressor to form a hermetic type compressor.

4. A cooling system as claimed in claim 2, said first and second refrigerant compressors having a first and second refrigerant outlet port for delivering the first and the second refrigerants compressed therein, respectively, which further comprises:
   a single refrigerant condenser connected in common to said first and said second outlet ports for condensing said first and said second compressed refrigerant to deliver a condensed refrigerant;
   a first refrigerant path for introducing at least one portion of said condensed refrigerant into said first evaporator as said first refrigerant; and
   a second refrigerant path for introducing at least one portion of said condensed refrigerant into said second evaporator as said second refrigerant.

5. A cooling system as claimed in claim 4, which further comprises a first valve connected to said first refrigerant path for selectively opening and closing said first refrigerant path, and a second valve connected to said second refrigerant path for selectively opening and closing said second refrigerant path.

6. A cooling system as claimed in claim 5, said first and said second refrigerant compressors having a first and a second inlet port for receiving said first and second refrigerants from said first and second evaporators, respectively, which further comprises a third refrigerant path for connecting said first and said second inlet ports and a third valve connected to said third refrigerant path for selectively opening and closing said third refrigerant path, whereby said second refrigerant compressor may operate together with said first compressor to compress said first refrigerant when said first and said third valves being operated to open said first and said third refrigerant paths, respectively while said second valve being operated to close said second refrigerant path.

7. The cooling system according to claim 2, wherein each of said first and second refrigerant compressors has an inlet, the improvement further comprising:
   valve means for controlling the flow of refrigerant between said first evaporator and the inlets of said first and second refrigerant compressors and for stopping the flow of refrigerant through said second evaporator.

8. The system for driving a refrigerant compressor according to claim 1 wherein said motor driving circuit is responsive to a temperature control signal to control the operation of said DC electric motor.

9. The system for driving a refrigerant compressor according to claim 2 wherein said motor driving circuit is responsive to a temperature control signal to control the operation of said DC electric motor.

10. The system for driving a refrigerant compressor according to claim 1, wherein said DC electric motor and said first refrigerant compressor are contained in a hermetically sealed housing.

* * * * *